April 26, 1949.   W. F. SAWYER   2,468,465
CHUCK FOR WOOD BIT BRACES
Filed Oct. 7, 1947
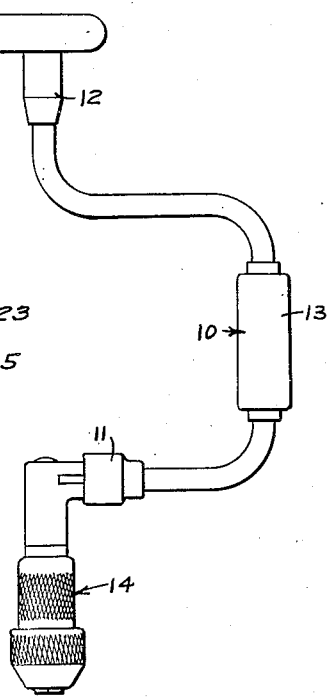
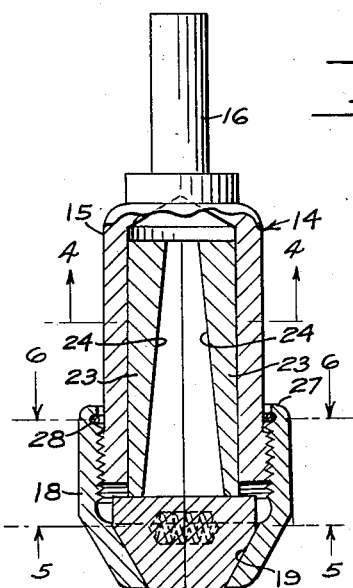
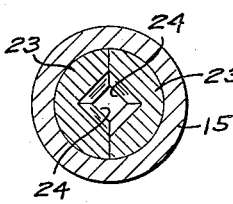
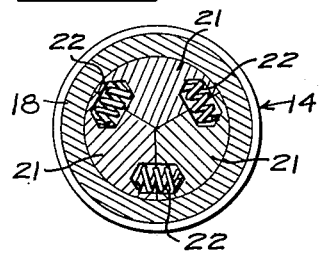
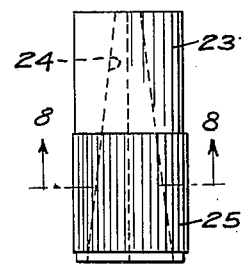
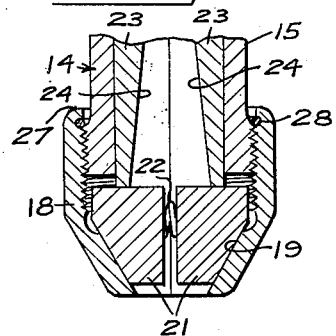
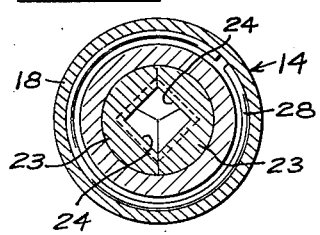
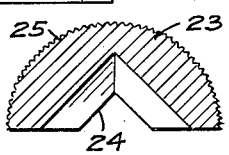
INVENTOR.
WILLIAM F. SAWYER
BY Victor J. Evans & Co.
ATTORNEYS Patented Apr. 26, 1949

2,468,465

UNITED STATES PATENT OFFICE 2,468,465

CHUCK FOR WOOD BIT BRACES

William F. Sawyer, Brighton, Mich.

Application October 7, 1947, Serial No. 778,514

2 Claims. (Cl. 279—56)

This invention relates to a chuck for a wood bit brace.

It is an object of the present invention to provide a chuck for a wood bit brace which will retain straight drills as well as the auger wood bits having the tapered shank end and wherein a positive drive will be effected upon the auger bit shank.

Other objects of the present invention are to provide a chuck for a wood bit brace adapted to retain both auger wood bits and round drill shanks which is of simple construction, inexpensive to manufacture, convenient to use and efficient in operation.

For a better understanding of the invention, reference may be had to the following detailed description taken in connection with the accompanying drawing, in which Fig. 1 is a side elevational view of a wood bit brace embodying the chuck of the present invention, Fig. 2 is a side elevational view of the chuck with portions broken away as shown in section, Fig. 3 is a fragmentary cross-sectional view of the chuck with the jaws released.

Figs. 4, 5, and 6 are transverse cross-sectional views taken respectively on lines 4—4, 5—5, and 6—6 of Fig. 2, Fig. 7 is a side elevational view of the internally tapered auger sleeve part, Fig. 8 is an enlarged transverse cross-sectional view taken on line 8—8 of Fig. 7.

Referring now to the figures, 10 represents a wood brace having a ratchet mechanism 11, a top handle 12 and a crank handle 13. On the lower end of the brace is fitted a chuck 14. This chuck 14 comprises a retaining member having a sleeve portion 15 and a shank 16 for attaching the chuck to the ratchet device 11. The sleeve is externally threaded to receive an internally threaded nose or nut 18 having a taper 19 for receiving three jaws 21 which are expanded when free by springs 22 extending between jaws and in recesses thereof. Within the sleeve 15 there are fitted sleeve parts 23 having tapered grooves 24 matching with one another and squared to receive the tapered head of a wood auger shank whereby to provide a positive connection therewith. The sleeve parts 23 are knurled as indicated at 25 to provide a tight fit with the interior of the sleeve portion 15. The nose sleeve has a flange 27 at its upper end beneath which is a spring ring 28 which serves as a stop as the nose is curved downwardly to release jaws 21.

If only a straight drill shank is to be retained it will be engaged only by the jaws 21, otherwise with the auger bit the tapered shank head will fit into tapered grooves 24.

While various changes may be made in the detail construction, it shall be understood that such changes shall be within the spirit and scope of the present invention as defined by the appended claims.

I claim:

1. A chuck for a wood bit brace comprising a retaining member having a sleeve portion and a shank portion, said sleeve portion being threaded at its lower end, internally tapered sleeve parts fitted into the sleeve portion and adapted to receive and positively retain the tapered head of an auger bit shank, an internally tapered nose sleeve adjusted on the sleeve portion, and jaws within the nose adapted to engage the internally tapered surface of the nose sleeve and the round shank of an auger bit.

2. A chuck for a wood bit brace comprising a sleeve having a mounted shank at one end and threads on the outer surface of the opposite end, internally tapered gripping elements positioned in the sleeve, an internally threaded nut having a tapered outer end threaded on said sleeve, a plurality of gripping jaws carried by said nut, said jaws having tapered outer surfaces corresponding with the inner surface of the tapered outer end of the nut, and registering sockets in adjoining surfaces thereof, and springs in said sockets urging the said jaws outwardly with the tapered outer surfaces thereof in engagement with the inner surface of the tapered outer end of the nut.

WILLIAM F. SAWYER.

REFERENCES CITED

The following references are of record in the file of this patent:

UNITED STATES PATENTS

| Number | Name | Date |
|---|---|---|
| 469,631 | Driggs | Feb. 23, 1892 |
| 482,616 | Buck | Sept. 13, 1892 |
| 1,647,831 | Jones | Nov. 1, 1927 |
| 2,118,485 | Brown | May 24, 1938 |